US012684602B2

(12) United States Patent
Maamari et al.

(10) Patent No.: US 12,684,602 B2
(45) Date of Patent: Jul. 14, 2026

(54) SCHEDULING INFORMATION BASED ON OPERATING ZONES

(71) Applicant: QUALCOMM Incorporated, San Diego, CA (US)

(72) Inventors: Diana Maamari, San Diego, CA (US); Mickael Mondet, Louannec (FR); Huilin Xu, Temecula, CA (US); Linhai He, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 434 days.

(21) Appl. No.: 18/349,897

(22) Filed: Jul. 10, 2023

(65) Prior Publication Data

US 2025/0024475 A1    Jan. 16, 2025

(51) Int. Cl.
*H04W 72/51*       (2023.01)
*H04W 72/12*       (2023.01)
*H04W 72/566*      (2023.01)

(52) U.S. Cl.
CPC ........... *H04W 72/51* (2023.01); *H04W 72/12* (2013.01); *H04W 72/566* (2023.01)

(58) Field of Classification Search
CPC ... H04W 72/51; H04W 72/12; H04W 72/566; H04W 72/0473; H04W 72/21; H04W 72/569; H04W 72/23
USPC .................................................. 370/329–330
See application file for complete search history.

(56) References Cited

U.S. PATENT DOCUMENTS

| | | | |
|---|---|---|---|
| 11,039,390 B2 | 6/2021 | Ang et al. | |
| 12,231,354 B1 * | 2/2025 | Matthews | ............. H04L 47/215 |
| 2019/0014589 A1 | 1/2019 | Yerramalli et al. | |
| 2019/0090299 A1 | 3/2019 | Ang et al. | |
| 2019/0380093 A1 * | 12/2019 | Ang | ................. H04W 52/0261 |
| 2020/0107265 A1 * | 4/2020 | Hwang | ................. H04W 72/51 |
| 2021/0266828 A1 * | 8/2021 | Hwang | ................. H04W 72/23 |
| 2023/0247489 A1 * | 8/2023 | Mehta | ................... H04W 24/02 455/574 |
| 2023/0319930 A1 * | 10/2023 | Klingenbrunn | ....... H04W 76/15 370/329 |
| 2025/0008430 A1 * | 1/2025 | Heng | ................ H04W 52/0209 |

OTHER PUBLICATIONS

International Search Report and Written Opinion—PCT/US2024/033376—ISA/EPO—Sep. 18, 2024.

* cited by examiner

*Primary Examiner* — Candal Elpenord
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration indication that specifies a configuration of multiple operating zones that are based at least in part on a first range of potential values for a first operating metric and a second range of potential values for a second operating metric. The UE may transmit an operating state indication that indicates a particular operating zone of the multiple operating zones. The UE may receive scheduling information that is based at least in part on the particular operating zone. Numerous other aspects are described.

30 Claims, 10 Drawing Sheets

400

| 5QI | Packet Delay Budget | Packet Error Rate | Default Maximum Data Burst Volume | Example Service |
|-----|---------------------|-------------------|-----------------------------------|-----------------|
| 1 | 100 msec | $10^{-2}$ | N/A | Conversational Voice |
| 2 | 150 msec | $10^{-2}$ | N/A | Conversational Voice (Live Streaming) |
| 6, 8, 9 | 300 msec | $10^{-6}$ | N/A | Video (Buffered Streaming) |
| ⋮ | ⋮ | ⋮ | ⋮ | ⋮ |
| 80 | 10 msec | $10^{-6}$ | N/A | Low Latency eMBB |
| 81 | 5 msec | $10^{-5}$ | 160 B | Remote Control |

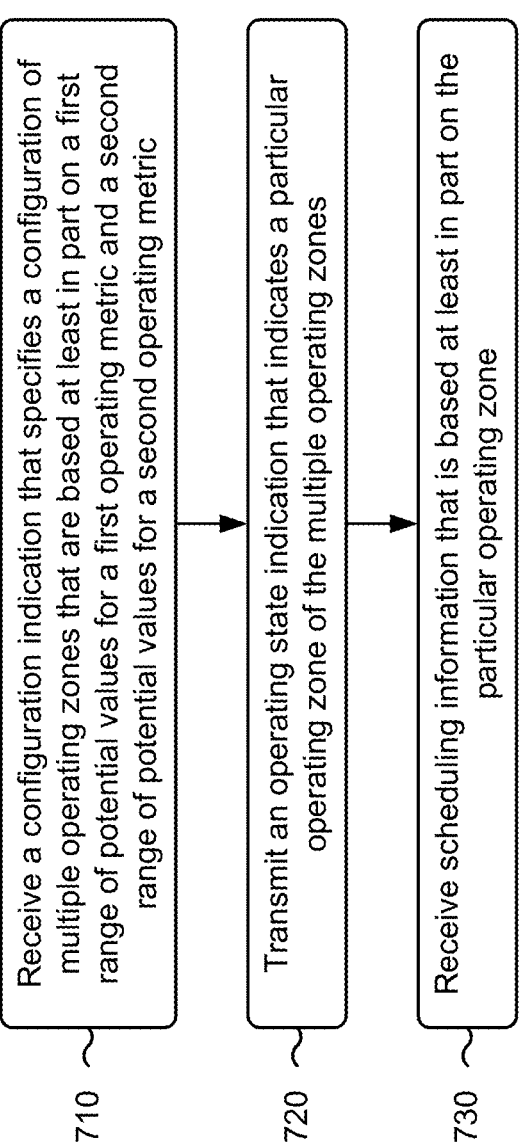

710 — Receive a configuration indication that specifies a configuration of multiple operating zones that are based at least in part on a first range of potential values for a first operating metric and a second range of potential values for a second operating metric 720 — Transmit an operating state indication that indicates a particular operating zone of the multiple operating zones 730 — Receive scheduling information that is based at least in part on the particular operating zone

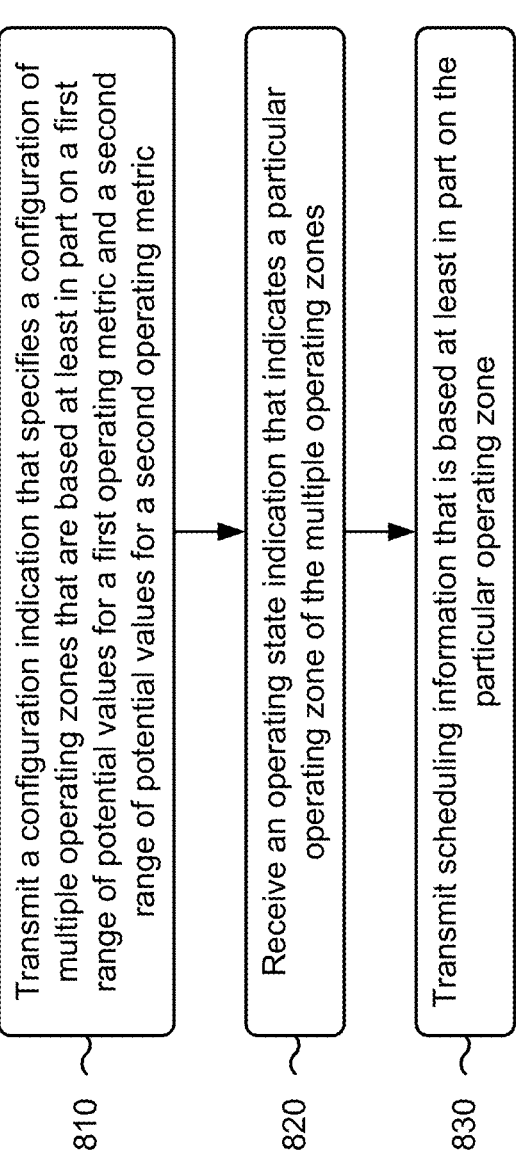

800

810   Transmit a configuration indication that specifies a configuration of multiple operating zones that are based at least in part on a first range of potential values for a first operating metric and a second range of potential values for a second operating metric 820   Receive an operating state indication that indicates a particular operating zone of the multiple operating zones 830   Transmit scheduling information that is based at least in part on the particular operating zone

FIG. 8

SCHEDULING INFORMATION BASED ON OPERATING ZONES

FIELD OF THE DISCLOSURE

Aspects of the present disclosure generally relate to wireless communication and to techniques and apparatuses for scheduling information based on operating zones.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a configuration indication that specifies a configuration of multiple operating zones that are based at least in part on a first range of potential values for a first operating metric and a second range of potential values for a second operating metric. The method may include transmitting an operating state indication that indicates a particular operating zone of the multiple operating zones. The method may include receiving scheduling information that is based at least in part on the particular operating zone.

Some aspects described herein relate to a method of wireless communication performed by a network node. The method may include transmitting a configuration indication that specifies a configuration of multiple operating zones that are based at least in part on a first range of potential values for a first operating metric and a second range of potential values for a second operating metric. The method may include receiving an operating state indication that indicates a particular operating zone of the multiple operating zones. The method may include transmitting scheduling information that is based at least in part on the particular operating zone.

Some aspects described herein relate to an apparatus for wireless communication at a UE. The apparatus may include one or more memories and one or more processors coupled to the one or more memories. The one or more processors may be configured, individually or collectively, to receive a configuration indication that specifies a configuration of multiple operating zones that are based at least in part on a first range of potential values for a first operating metric and a second range of potential values for a second operating metric. The one or more processors may be configured, individually or collectively, to transmit an operating state indication that indicates a particular operating zone of the multiple operating zones. The one or more processors may be configured to receive scheduling information that is based at least in part on the particular operating zone.

Some aspects described herein relate to an apparatus for wireless communication at a network node. The apparatus may include one or more memories and one or more processors coupled to the one or more memories. The one or more processors may be configured, individually or collectively, to transmit a configuration indication that specifies a configuration of multiple operating zones that are based at least in part on a first range of potential values for a first operating metric and a second range of potential values for a second operating metric. The one or more processors may be configured, individually or collectively, to receive an operating state indication that indicates a particular operating zone of the multiple operating zones. The one or more processors may be configured, individually or collectively, to transmit scheduling information that is based at least in part on the particular operating zone.

Some aspects described herein relate to a non-transitory computer-readable medium that stores a set of instructions for wireless communication by a UE. The set of instructions, when executed by one or more processors of the UE, may cause the UE to receive a configuration indication that specifies a configuration of multiple operating zones that are based at least in part on a first range of potential values for a first operating metric and a second range of potential values for a second operating metric. The set of instructions, when executed by one or more processors of the UE, may cause the UE to transmit an operating state indication that indicates a particular operating zone of the multiple operating zones. The set of instructions, when executed by one or more processors of the UE, may cause the UE to receive scheduling information that is based at least in part on the particular operating zone.

Some aspects described herein relate to a non-transitory computer-readable medium that stores a set of instructions for wireless communication by a network node. The set of instructions, when executed by one or more processors of the network node, may cause the network node to transmit a configuration indication that specifies a configuration of multiple operating zones that are based at least in part on a first range of potential values for a first operating metric and a second range of potential values for a second operating metric. The set of instructions, when executed by one or more processors of the network node, may cause the network node to receive an operating state indication that indicates a particular operating zone of the multiple operating zones. The set of instructions, when executed by one or more processors of the network node, may cause the network node to transmit scheduling information that is based at least in part on the particular operating zone.

Some aspects described herein relate to an apparatus for wireless communication. The apparatus may include means for receiving a configuration indication that specifies a configuration of multiple operating zones that are based at least in part on a first range of potential values for a first operating metric and a second range of potential values for a second operating metric. The apparatus may include means for transmitting an operating state indication that indicates a particular operating zone of the multiple operating zones. The apparatus may include means for receiving scheduling information that is based at least in part on the particular operating zone.

Some aspects described herein relate to an apparatus for wireless communication. The apparatus may include means for transmitting a configuration indication that specifies a configuration of multiple operating zones that are based at least in part on a first range of potential values for a first operating metric and a second range of potential values for a second operating metric. The apparatus may include means for receiving an operating state indication that indicates a particular operating zone of the multiple operating zones. The apparatus may include means for transmitting scheduling information that is based at least in part on the particular operating zone.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of a table that indicates multiple operating specifications that are associated with wireless data transfer, in accordance with the present disclosure.

FIG. 7 is a diagram illustrating an example process performed, for example, by a UE, in accordance with the present disclosure.

FIG. 8 is a diagram illustrating an example process performed, for example, by a network node, in accordance with the present disclosure.

DETAILED DESCRIPTION

Figure 1:
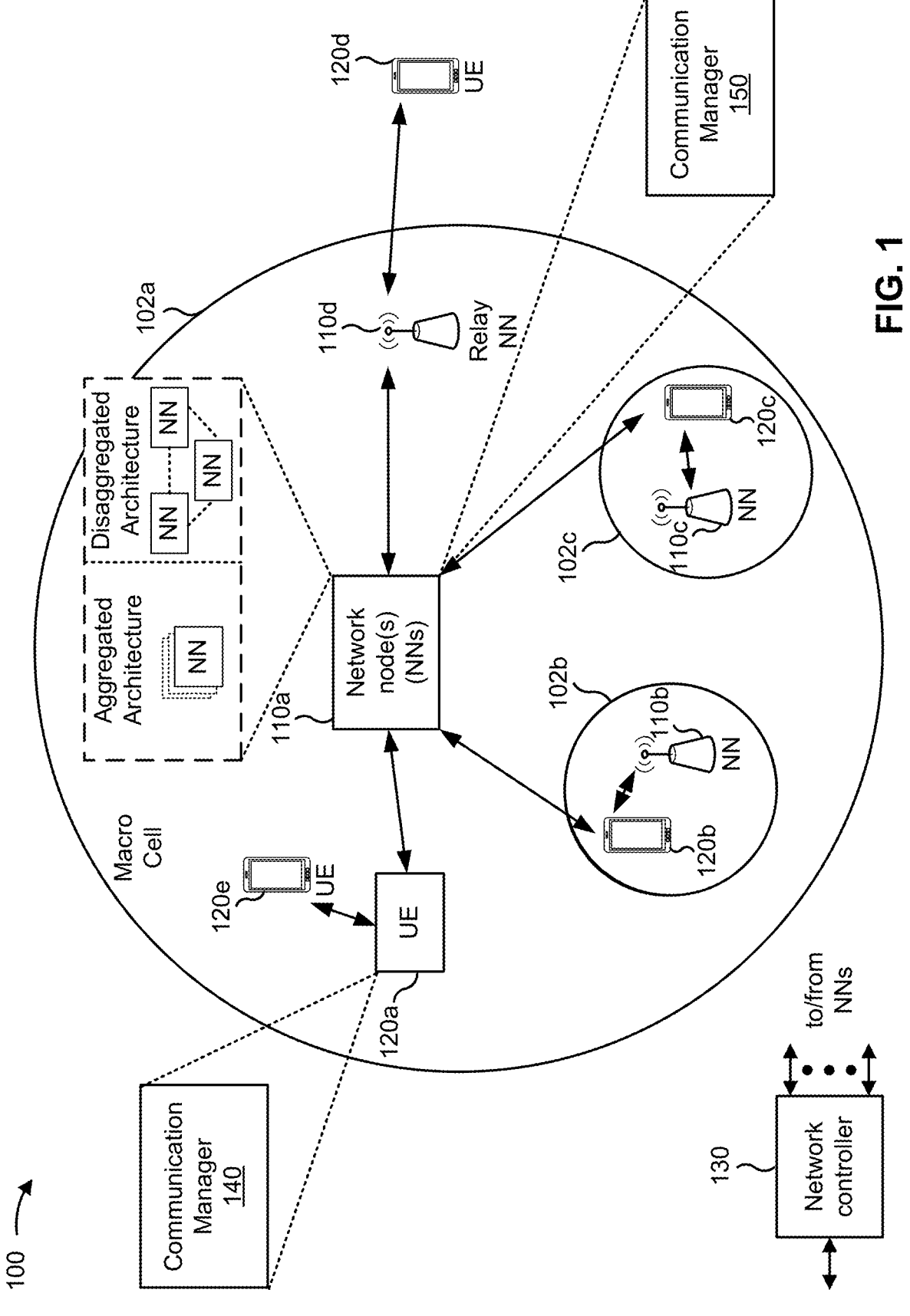
FIG. 1 is a diagram illustrating an example of a wireless network, in accordance with the present disclosure.

Different applications that use wireless communication for data transfer may have varying operating specifications on how the data is transferred between devices. To illustrate, a first quality-of-service (QOS) flow may have different operating specifications relative to a second QoS flow. In some aspects, a tradeoff exists between meeting the different operating specifications. As one example, a tradeoff may exist between a first operating specification associated with power consumption and a second operating specification associated with a data transfer latency. To illustrate, achieving a particular data transfer latency at a user equipment (UE) may be associated with the UE consuming power at a particular power consumption rate. In some aspects, the tradeoff may vary based at least in part on an operating condition at the UE and/or a capability of the UE. Without knowledge of an operating condition of the UE and/or the associated tradeoff variations, a network node may select a scheduling configuration for the UE that results in needless power consumption and/or a reduced battery life at the UE. Alternatively, or additionally, the network node may select a scheduling configuration that results in a data transfer latency failing to meet an operating specification.

Various aspects described herein generally relate to scheduling information based on operating zones. Some aspects relate more specifically to a network node selecting a scheduling configuration based at least in part on operating zones. In some aspects, a UE may receive a configuration indication that specifies a configuration of multiple operating zones that are based at least in part on a first range of potential values for a first operating metric and a second range of potential values for a second operating metric. As one example, the first range of potential values may be associated with a power consumption metric, and the second range of potential values may be associated with a data transfer latency. Based at least in part on receiving the configuration indication, the UE may transmit an operating state indication that indicates a particular operating zone of the multiple operating zones. To illustrate, the UE may select the particular operating zone based at least in part on an observed data transfer latency, an observed power consumption, and/or an observed battery power level. Alternatively, or additionally, the UE may report one or more metrics generated by the UE. Based at least in part on transmitting the operating state indication, the UE may receive scheduling information that is based at least in part on the particular operating zone. In some aspects, the scheduling information may indicate a scheduling configuration that is based at least in part on prioritizing the first operating metric higher than the second operating metric (or vice versa).

In some aspects, a network node may transmit a configuration indication that specifies a configuration of multiple operating zones that are based at least in part on a first range of potential values for a first operating metric and a second range of potential values for a second operating metric. Alternatively, or additionally, the multiple operating zones may be based at least in part on various prioritizations of the first operating metric and the second operating metric. The network node may receive an operating state indication that indicates a particular operating zone of the multiple operating zones, and may select a scheduling configuration based at least in part on the particular operating zone. In some aspects, the network node may transmit scheduling information that indicates the scheduling configuration.

The ability for a network node to indicate multiple operating zones that are based at least in part on various prioritizations of a first operating metric and a second operating metric, and/or the ability for a UE to indicate selection of a particular operating zone, may enable the network node and the UE to jointly determine a scheduling configuration that is based at least in part on satisfying prioritizations associated with the first operating metric and the second operating metric. For instance, receiving an indication of the particular operating zone from the UE may enable a network node to select a first scheduling configuration that prioritizes data transfer latency over power consumption and/or a second scheduling configuration that prioritizes power consumption over data transfer latency. Accordingly, the ability to select a scheduling configuration based on a prioritization may preserve a battery life at the UE and/or may enable the wireless network to satisfy an operating specification.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120*c*, a UE 120*d*, and a UE 120*c*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHZ-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHz-114.25 GHZ), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include midband frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., a UE 120) may include a communication manager 140. As described in more detail elsewhere herein, the communication manager 140 may receive a configuration indication that specifies a configuration of multiple operating zones that are based at least in part on a first range of potential values for a first operating metric and a second range of potential values for a second operating metric; transmit an operating state indication that indicates a particular operating zone of the multiple operating zones; and receive scheduling information that is based at least in part on the particular operating zone. Additionally, or alternatively, the communication manager 140 may perform one or more other operations described herein.

In some aspects, a network node (e.g., a network node 110) may include a communication manager 150. As described in more detail elsewhere herein, the communication manager 150 may transmit a configuration indication that specifies a configuration of multiple operating zones that are based at least in part on a first range of potential values for a first operating metric and a second range of potential values for a second operating metric; receive an operating state indication that indicates a particular operating zone of the multiple operating zones; and transmit scheduling information that is based at least in part on the particular operating zone. Additionally, or alternatively, the communication manager 150 may perform one or more other operations described herein.

As indicated above, FIG. 1 is provided as an example. Other examples may differ from what is described with regard to FIG. 1.

Figure 2:
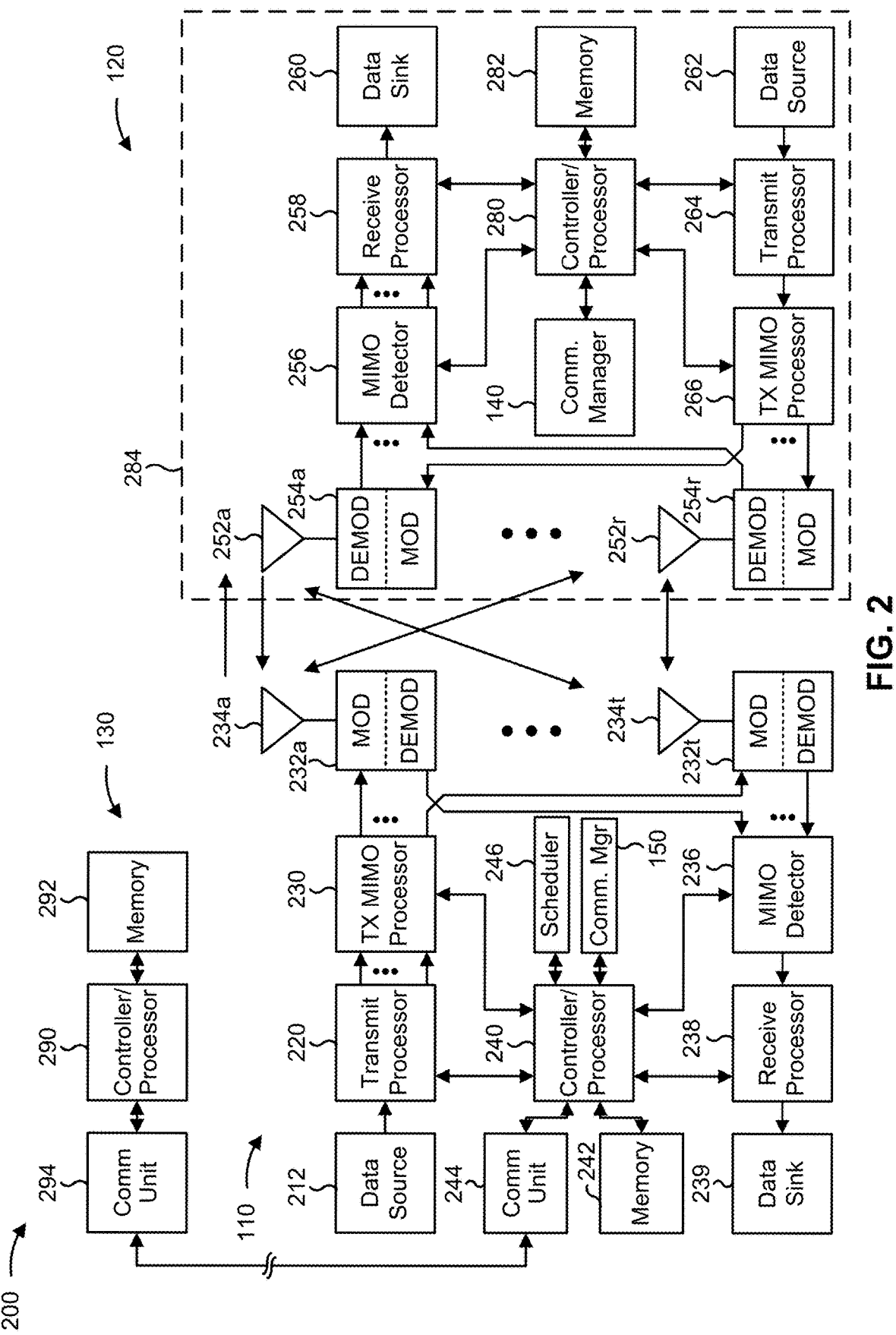
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

The controller/processor 240 of the network node 110, the controller/processor 280 of the UE 120, and/or any other component(s) of FIG. 2 may perform one or more techniques associated with scheduling information based on operating zones, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a UE (e.g., a UE 120) includes means for receiving a configuration indication that specifies a configuration of multiple operating zones that are based at least in part on a first range of potential values for a first operating metric and a second range of potential values for a second operating metric; means for transmitting an operating state indication that indicates a particular operating zone of the multiple operating zones; and/or means for receiving scheduling information that is based at least in part on the particular operating zone. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., a network node 110) includes means for transmitting a configuration indication that specifies a configuration of multiple operating zones that are based at least in part on a first range of potential values for a first operating metric and a second range of potential values for a second operating metric; means for receiving an operating state indication that indicates a particular operating zone of the multiple operating zones; and/or means for transmitting scheduling information that is based at least in part on the particular operating zone. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
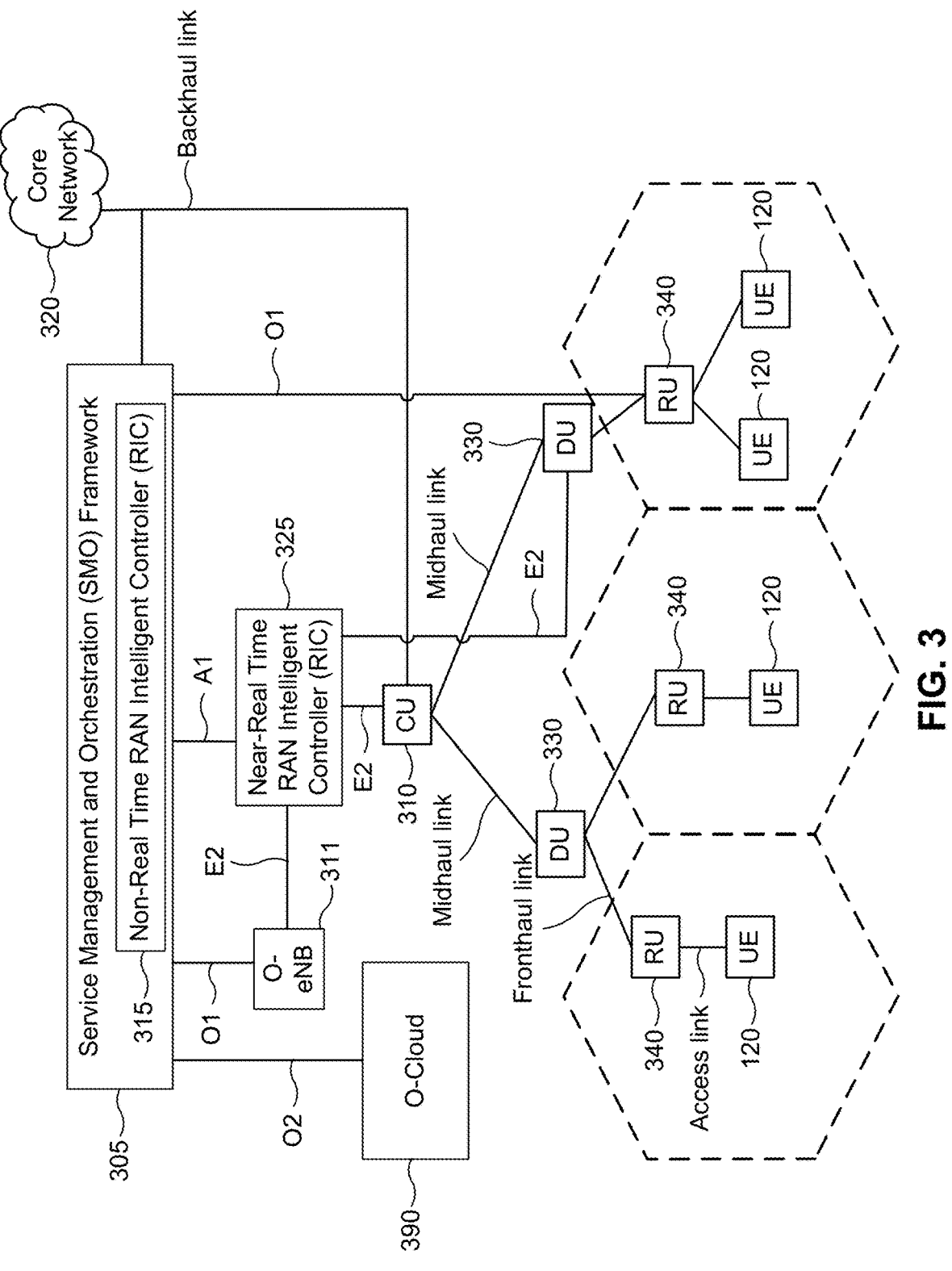
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

FIG. 4 is a diagram illustrating an example 400 of a table that indicates multiple operating specifications that are associated with wireless data transfer, in accordance with the present disclosure.

Different applications that use wireless communication for data transfer may have varying operating specifications on how the data is transferred between devices. To illustrate, a first quality-of-service (QOS) flow may have different operating specifications relative to a second QoS flow. For instance, each QoS may be assigned and/or associated with a respective 5G QoS identifier (5QI) value, and each 5QI value may be associated with one or more operating specifications (e.g., a priority level, a latency limit, an error rate, and/or a bit rate). For instance, as shown by row 402, a 5QI value of "1" may be associated with a packet delay budget of 100 milliseconds (msec), a packet error rate of 10-2, and/or may not be associated with a maximum burst volume. As shown by row 404, a 5QI value of "80" may be associated with a packet delay budget of 10 msec, a packet error rate of 10-6, and/or may not be associated with a maximum burst volume. Accordingly, QoS flows may be assigned different 5QI values based at least in part on an application that is associated with the QoS flow. For example, a non-streaming voice application (e.g., conversational voice) may be associated with a 5QI value of "1" as indicated by the table 400, and an enhanced mobile broadband (eMBB) application may be associated with a 5QI value of "80". Alternatively, or additionally, an extended reality (XR) application (e.g., virtual reality and/or augmented reality) may have less tolerance to data transfer latencies and/or packet errors relative to an eMBB application and/or a non-streaming voice application. Accordingly, an XR application may be assigned a 5QI value that is associated with a smaller packet delay budget and/or a lower packet error rate relative to the non-streaming conversational voice application and/or the eMBB application.

In some aspects, a tradeoff exists between reducing power consumption and reducing data transfer latency. For instance, reduced data transfer latency may be associated with increased power consumption, and reduced power consumption may be associated with increased data transfer latency. As one non-limiting example, a UE may perform physical downlink control channel (PDCCH) skipping based at least in part on operating in a power saving mode. "PDCCH skipping" may denote the UE refraining from monitoring (e.g., skipping monitoring) a configured PDCCH control search space for a specified time span and/or until receiving instructions to begin monitoring the configured PDCCH control search space. Based at least in part on receiving an instruction to enable PDCCH skipping, the UE may enter a sleep mode that reduces power consumption by the UE. In some aspects, the UE may perform PDCCH skipping in combination with a hybrid automatic repeat request (HARQ) process that includes retransmissions. Depending upon one or more operating conditions at the UE, performing the PDCCH skipping in combination with the HARQ process may result in needless power consumption and/or increased data transfer latencies that exceed an operating condition.

To illustrate, for uplink retransmissions, the UE may unnecessarily transition out of the sleep mode when a HARQ round trip time (RTT) timer expires. However, in some scenarios, a data transfer latency tolerance of a first application that is associated with the data transfer may be large enough such that the UE could remain in the sleep mode longer and increase power savings. Thus, for such a scenario, the UE waking up from the sleep mode may reduce an amount of power saved by the UE and/or needlessly consume power at the UE. As another example, for downlink transmissions, downlink control information (DCI) that schedules a last physical downlink shared channel (PDSCH) transmission may include an instruction to enable PDCCH skipping. Based at least in part on receiving the instruction to enable PDCCH skipping, the UE may transition into the power saving mode. In some aspects, however, the UE may decode the PDSCH with errors and transmit a HARQ negative acknowledgement (NACK) for a retransmission of the PDSCH. Based at least in part on PDCCH skipping being enabled, the UE may wait until PDCCH skipping has completed and/or has been disabled to receive the PDSCH retransmission. In some scenarios, the data transfer latency tolerance of a second application that is associated with the data transfer may be smaller than the duration that the UE waits to receive the retransmission (e.g., based at least in part on PDCCH skipping being enabled), which may result in errors at the second application and/or the UE and a network node failing to satisfy a data transfer latency operating specification (e.g., a 5QI specification). Without knowledge of an operating condition of the UE, such as a battery power level and/or an observed data transfer latency, the network node may select a scheduling configuration for the UE that results in needless power consumption and/or a reduced battery life at the UE. Alternatively, or additionally, the network node may select a scheduling configuration that results in a data transfer latency failing to meet a 5QI requirement, resulting in errors at an associated application.

Some techniques and apparatuses described herein provide scheduling information based on operating zones. In some aspects, a UE may receive a configuration indication that specifies a configuration of multiple operating zones that are based at least in part on a first range of potential values for a first operating metric and a second range of potential values for a second operating metric. As one example, the first range of potential values may be associated with a power consumption metric, and the second range of potential values may be associated with a data transfer latency. Each operating zone may be characterized based at least in part on a respective threshold for the first operating metric and/or a respective threshold for the second operating metric, as described with regard to FIG. 5. Based at least in part on receiving the configuration indication, the UE may transmit an operating state indication that indicates a particular operating zone of the multiple operating zones. To illustrate, the UE may select the particular operating zone based at least in part on an observed data transfer latency, an observed power consumption, and/or an observed battery power level. Alternatively, or additionally, the UE may report one or more metrics generated by the UE. Based at least in part on transmitting the operating state indication, the UE may receive scheduling information that is based at least in part on the particular operating zone. In some aspects, the scheduling information may indicate a scheduling configuration that is based at least in part on prioritizing the first operating metric higher than the second operating metric (or vice versa).

In some aspects, a network node may transmit a configuration indication that specifies a configuration of multiple operating zones that are based at least in part on a first range of potential values for a first operating metric and a second range of potential values for a second operating metric. For instance, as one non-limiting example, the multiple operating zones may be based at least in part on a first range of values associated with a data transfer latency metric and/or a second range of values associated with a power consumption metric. In some aspects, the multiple operating zones may be based at least in part on a third range of values associated with a battery life metric. Alternatively, or additionally, the multiple operating zones may be based at least in part on various prioritizations of the first operating metric and the second operating metric. The network node may receive an operating state indication that indicates a particular operating zone of the multiple operating zones, and transmit scheduling information that is based at least in part on the particular operating zone. That is, the network node May select a scheduling configuration based at least in part on the particular operating zone, and the scheduling information may indicate the scheduling configuration.

The ability for a network node to indicate multiple operating zones that are based at least in part on various prioritizations of a first operating metric and a second operating metric, and/or the ability for a UE to indicate selection of a particular operating zone, may enable the network node and the UE to jointly determine a scheduling configuration that is based at least in part on satisfying prioritizations associated with the first operating metric and the second operating metric. For instance, receiving an indication of the particular operating zone from the UE may enable a network node to select a first scheduling configuration that prioritizes data transfer latency over power consumption and/or a second scheduling configuration that prioritizes power consumption over data transfer latency. As one example, the scheduling configuration may indicate an operating mode for PDCCH skipping (e.g., enabled or disabled). To illustrate, the scheduling configuration may indicate an enabled operating mode for PDCCH skipping based at least in part on prioritizing reducing power consumption over reducing data transfer latency. As another example, the scheduling configuration may indicate a disabled operating mode for PDCCH skipping based at least in part on prioritizing reducing a data transfer latency metric over reducing a power consumption metric. Accordingly, as a first non-limiting example of a scheduling configuration, a network node may select the operating mode of PDCCH skipping based at least in part on an operating state indication from the UE as described below.

As a second non-limiting example of a scheduling configuration, the network node may select a configuration for one or more physical uplink shared channel (PUSCH) occasions based at least in part on a prioritization between the first operating metric and the second operating metric. For instance, based at least in part on prioritizing reducing a data transfer delay over reducing power consumption, the network node may select a first scheduling configuration that includes more occasions and/or a smaller resource allocation relative to a second scheduling configuration. Based at least in part on prioritizing reducing power consumption over reducing data transfer latency, the second scheduling configuration selected by the network node may have fewer occasions and/or a larger resource allocation relative to the first scheduling configuration.

As a third non-limiting example of a scheduling configuration, the network node may select an operating mode for a Proportional Fairness Scheduler (e.g., enabled or disabled). To illustrate, the network node may select a disabled operating mode in scenarios that are associated with low data transfer latency tolerance. In some aspects, the network node may select a scheduling configuration based at least in part on a remaining uplink delay budget. For instance, the network node may calculate the remaining uplink delay budget when scheduling the UE on one or more sub-bands, and select a scheduling configuration that is structured to satisfy the remaining uplink delay budget.

Operating zones that are based at least in part on various prioritizations of a first operating metric and a second operating metric may enable a UE to provide feedback about a current operating state (e.g., a current operating zone) and a network node to select a scheduling configuration that satisfies a prioritization associated with the operating state, such as a first scheduling configuration that prioritizes reducing data transfer latency over power consumption and/or a second scheduling configuration that prioritizes reducing power consumption over reducing data transfer latency. The ability to select a scheduling configuration based on a prioritization may preserve a battery life at the UE and/or may enable the wireless network to satisfy operating specifications.

As indicated above, FIG. 4 is provided as an example. Other examples may differ from what is described with regard to FIG. 4.

Figure 5:
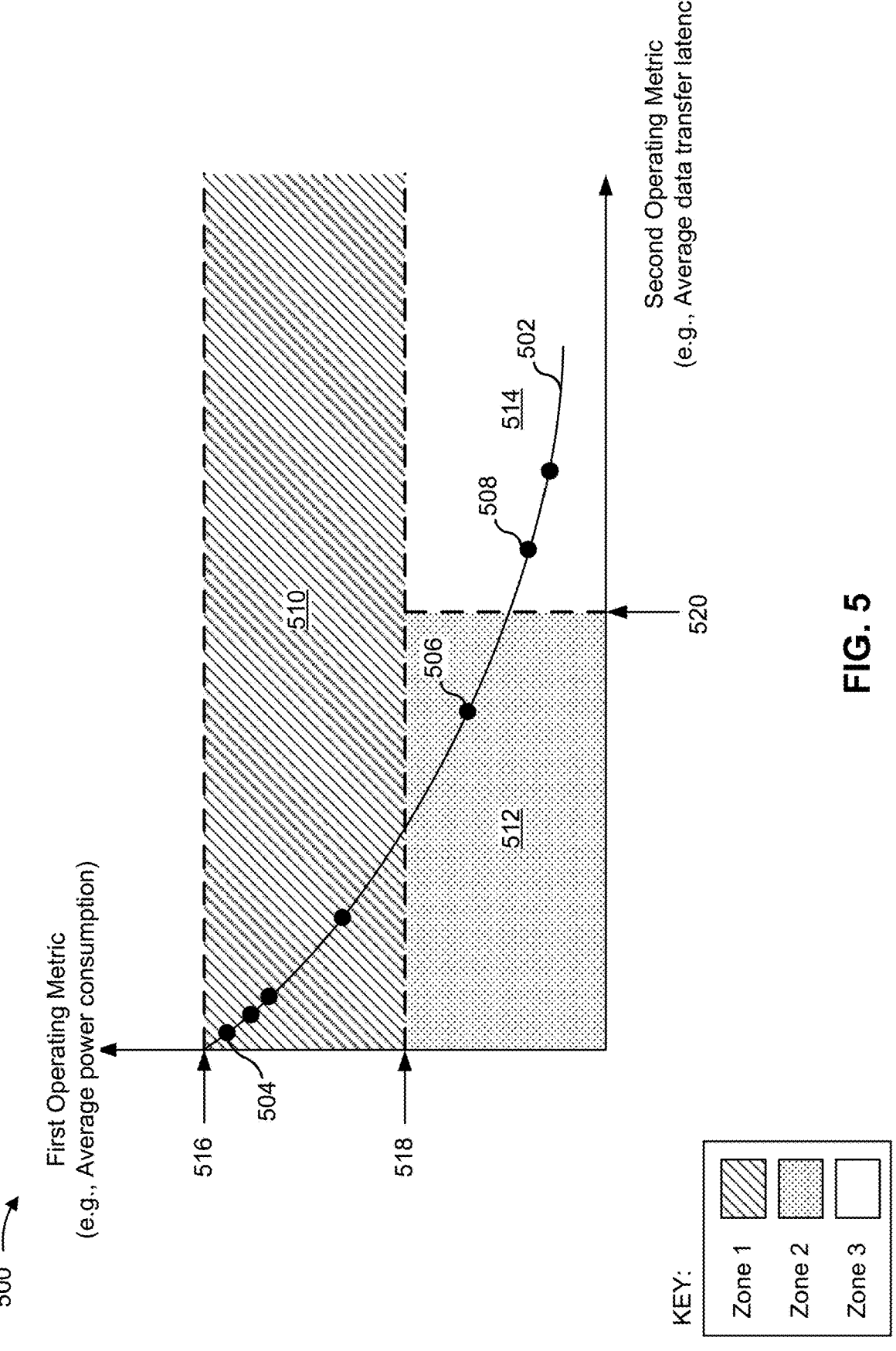
FIG. 5 is a diagram illustrating an example of operating zones that are associated with a prioritization of operating metrics, in accordance with the present disclosure.

FIG. 5 is a diagram illustrating an example 500 of operating zones that are associated with a prioritization of operating metrics, in accordance with the present disclosure. A horizontal axis represents a first range of values associated with a first operating metric (e.g., an average power consumption metric) and a vertical axis represents a second range of values associated with a second operating metric (e.g., an average data transfer latency).

In some aspects, a UE (e.g., a UE 120) may be associated with an operating profile 502 that is based at least in part on a joint metric. "Joint metric" may denote a metric that is based at least in part on two or more metrics that have an association, such as the first operating metric and the second operating metric (e.g., power consumption and data transfer delay). To illustrate, a first data point 504 on the operating profile 502 may represent a first joint metric that is based at least in part on a first average power consumption value that is associated with a first average data transfer latency value. That is, a UE associated with the operating profile 502 may, on average, achieve the first data transfer latency value based at least in part on consuming an amount of power as indicated by the first power consumption value. Alternatively, or additionally, a UE associated with the operating profile 502 may, on average, operate at a power consumption rate indicated by the first power consumption value and achieve a data transfer latency indicated by the first data transfer latency value. A second data point 506 on the operating profile 502 may represent a second joint metric that is based at least in part on a second power consumption value that is associated with a second data transfer latency, and/or a third data point 508 on the operating profile may represent a third joint metric that is based at least in part on a third power consumption value that is associated with a third data transfer latency. Accordingly, an operating profile may indicate a relationship between the two operating metrics of the joint metric over a range of values (e.g., the first range of values and the second range of values).

A network node (e.g., a network node 110) may select an operating zone configuration that characterizes multiple operating zones that are based at least in part on a joint metric and/or multiple operating metrics. As one example, the network node may select an operating zone configuration that configures a first operating zone 510 (shown with a diagonal pattern), a second operating zone 512 (shown with a shaded/dotted pattern), and a third operating zone 514 (shown in solid white). In some aspects, the network node may select the operating zone configuration based at least in part on a UE-specific operating profile (e.g., the operating profile 502). While FIG. 5 illustrates three operating zones, other examples may include the network node configuring more or fewer operating zones.

As shown by FIG. 5, the operating zone configuration may specify that the first operating zone 510 is characterized based at least in part on a first power consumption threshold 516 and a second power consumption threshold 518 (e.g., the first operating zone 510 resides at and/or between the first power consumption threshold 516 and the second power consumption threshold 518). Alternatively, or additionally, the first operating zone 510 may be characterized based at least in part on the second range of values associated with an average data transfer latency metric. That is, the first operating zone 510 may span an entirety of the second range of values. As shown by FIG. 5, the operating zone configuration may indicate that the second operating zone 512 is characterized based at least in part on the second power consumption threshold 518 and a data transfer latency threshold 520 (e.g., the second operating zone 512 resides at and/or within a first region characterized by the second power consumption threshold 518 and the data transfer latency threshold 520). The operating zone configuration may also indicate that the third operating zone 514 resides at and/or within a second region that may be characterized by the second power consumption threshold 518 and the data transfer latency threshold 520.

In some aspects, each operating zone may be associated with a respective prioritization between the multiple operating metrics. For instance, the first operating zone 510 may be associated with the first operating metric and the second operating metric having a same prioritization level, the second operating zone 512 may be associated with the second operating metric having a higher prioritization relative to the first operating metric, and/or the third operating zone 514 may be associated with the first operating metric having a higher prioritization relative to the second operating metric. In some aspects, each operating zone (and/or a respective operating zone configuration) may be associated with a scheduling configuration that is associated with satisfying the prioritization, such as a first scheduling configuration that reduces power consumption at the tradeoff of an associated data transfer latency and/or a second scheduling configuration that reduces a data transfer latency at the tradeoff of an associated power consumption rate. Some non-limiting examples of scheduling configurations may include any combination of a timing offset configuration (e.g., a K0 offset, a K1 offset, and/or a K2 offset), a bandwidth part (BWP) configuration, a UE reporting configuration, a secondary synchronization signal (SSS) configuration, a wake up signal (WUS) monitoring configuration, a measurement gap periodicity, a component carrier (CC) configuration, a supplementary uplink (SUL) configuration, a PDCCH skipping configuration (e.g., enabled and/or disabled), and/or a retransmission configuration (e.g., a retransmission timer duration).

Figure 6:
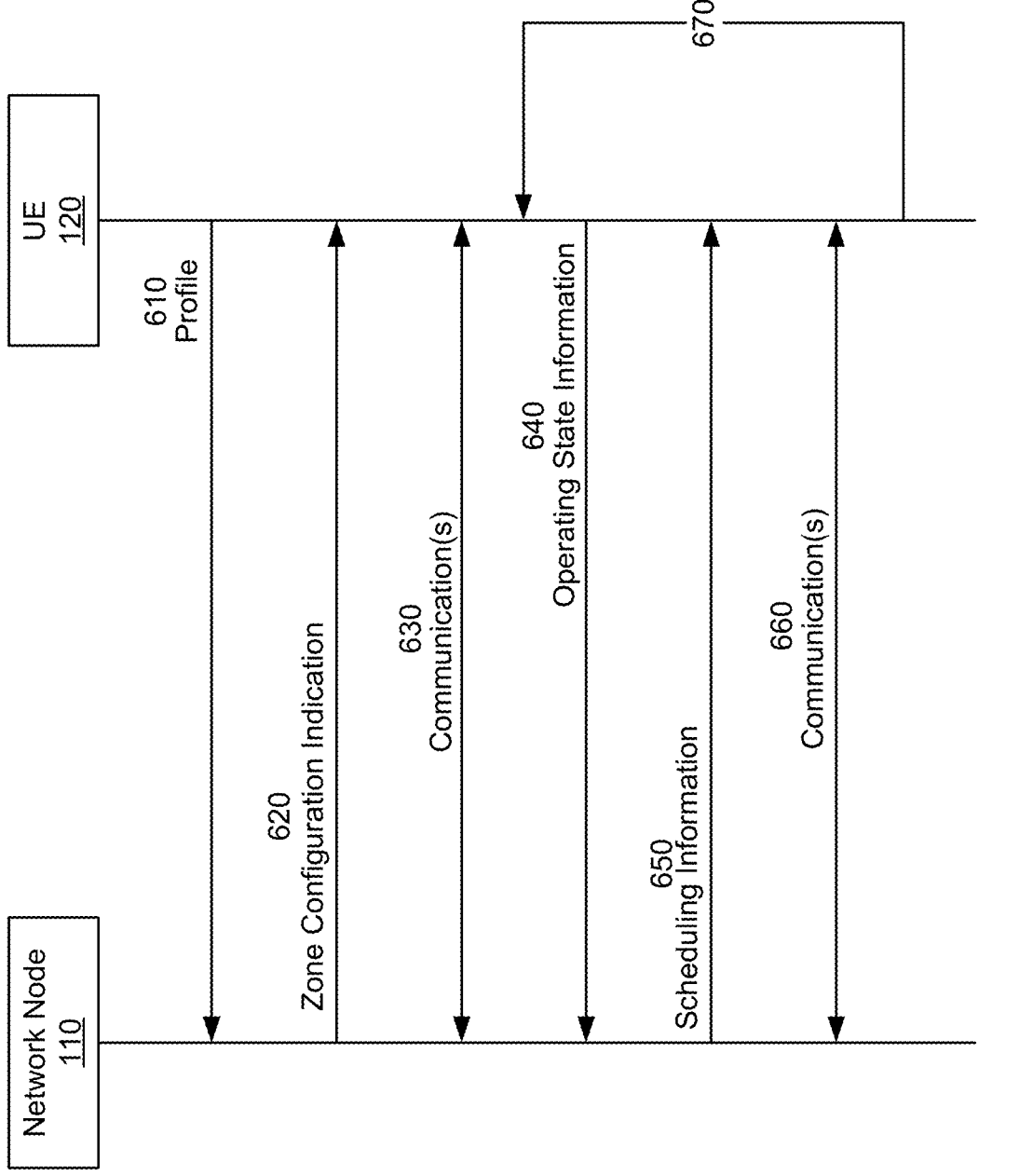
FIG. 6 is a diagram illustrating an example of a wireless communication process between a network node and a UE, in accordance with the present disclosure.

As described with regard to FIG. 6, a network node may indicate the operating zone configuration to a UE, such as by indicating one or more threshold values that characterize the multiple operating zones and/or by indicating selection of an operating zone configuration from a table. The UE may provide feedback to the network node that indicates a particular operating zone that the UE is experiencing and/or has observed. To illustrate, the UE may calculate a joint metric based at least in part on calculating a power consumption metric and/or a data transfer delay metric, and identify the particular operating zone using the joint metric. For instance, the UE may calculate, as a first joint metric, the first data point 504 and determine that the particular operating zone is the first operating zone 510. Alternatively, or additionally, the UE May calculate, as a second joint metric, the third data point 508 and determine that the particular operating zone is the third operating zone 514. Accordingly, the UE may transmit an operating state indication that indicates the particular operating zone and/or metrics calculated by the UE as described below. Based at least in part on receiving the feedback, the network node may select a scheduling configuration that is designed to satisfy the associated prioritization.

The ability for a network node to indicate multiple operating zones that are based at least in part on various prioritizations of a first operating metric and a second operating metric, and/or the ability for a UE to indicate a particular operating zone and/or an operating state at the UE, may enable the network node and the UE to jointly determine a scheduling configuration that is based at least in part on satisfying a prioritization between multiple operating metrics. Accordingly, the network node may, for example, select a first scheduling configuration that reduces power consumption to preserve a battery life of the UE and/or a second scheduling configuration that reduces a data transfer latency to satisfy a 5QI operating specification based at least in part on an operating state of the UE.

As indicated above, FIG. 5 is provided as an example. Other examples may differ from what is described with regard to FIG. 5.

FIG. 6 is a diagram illustrating an example 600 of a wireless communication process between a network node (e.g., the network node 110) and a UE (e.g., the UE 120), in accordance with the present disclosure.

As shown by reference number 610, a UE 120 may transmit, and a network node 110 may receive, profile information. In some aspects, the profile information may specify a UE-specific operating profile that is based at least in part on a first operating metric and a second operating metric, such as the operating profile 502 described with regard to FIG. 5. For example, the UE-specific operating profile may be based at least in part on a power consumption metric and a data transfer latency metric. Alternatively, or additionally, the UE-specific operating profile may be based at least in part on a first range of values for the first operating metric and/or a second range of values for the second operating metric. Other non-limiting examples of operating metrics may include a capacity metric, a data throughput metric, a coverage metric, and/or an observed data throughput metric. As another example, the profile information may specify joint statistics (e.g., statistical values that are based at least in part on the first operating metric and the second operating metric) and/or joint metrics. One example of a joint metric may include an observed power consumption that is associated with an observed data transfer latency. Some non-limiting examples of a joint statistic may include an average (mean) metric and/or a percentile metric (e.g., a 50%-tile metric and/or a 99%-tile metric).

The UE 120 may transmit the profile information in any combination of Layer 1 signaling (e.g., uplink control information (UCI)), Layer 2 signaling (e.g., a MAC control element (CE)), and/or Layer 3 signaling (e.g., RRC signaling). To illustrate, the UE 120 may transmit the profile information via RRC signaling in UE capability information and/or in response to an RRC request message. Alternatively, or additionally, the UE 120 may autonomously transmit the profile information in Layer 1 or Layer 2 signaling. As one example, the network node 110 may configure and/or instruct the UE 120 to transmit the profile information based at least in part on detecting a trigger event. In some aspects, the network node 110 may specify a trigger event and/or a configuration of a trigger event that is associated with transmitting the profile information, such as by specifying a trigger event that is based at least in part on a data point of the operating profile changing from a prior operating profile by a change threshold and/or by specifying a value for the change threshold.

In some aspects, the UE 120 may obtain the UE-specific operating profile from memory at the UE 120. For example, the UE-specific operating profile may be generated as part of a manufacturing process and/or stored in memory at the UE 120 as part of the manufacturing process. Alternatively, or additionally, the UE 120 may generate the UE-specific operating profile based at least in part on uplink communications and/or downlink communications. To illustrate, the UE 120 may calculate multiple operating metrics (e.g., one or more power consumption metrics and/or one or more data transfer delay metrics) iteratively and/or over a time span based at least in part on the uplink communications and/or the downlink communications. For instance, the UE 120 may calculate, as the multiple operating metrics, a first data transfer delay metric and a first power consumption metric at a first point in time, a second data transfer delay metric and a second power consumption metric at a second point in time, and/or a third data transfer delay metric and a third power consumption metric at a third point in time. Alternatively, or additionally, the UE 120 may generate the UE-specific operating profile based at least in part on the multiple operating metrics calculated by the UE 120.

In some aspects, the UE 120 may update the UE-specific operating profile based at least in part on calculating additional operating metrics and/or may transmit an indication of the updated UE-specific operating profile. Alternatively, or additionally, the UE 120 may calculate updates that are based at least in part on a default operating profile (e.g., stored in memory at the UE 120 as part of a manufacturing process as described above). By transmitting profile information, the UE 120 may enable the network node 110 to select an operating zone configuration (e.g., one or more thresholds that characterize an operating zone) that is based at least in part on UE-specific information and, consequently, select a transmission configuration for the UE 120 that better satisfies a priority (e.g., power consumption priority and/or a data transfer latency priority) relative to other transmission configurations. That is, each UE indicating respective profile information enables the network node 110 to select different operating zone configurations for UEs with different capabilities. To illustrate, based at least in part on profile information, the network node may select a first operating zone configuration for an eMBB-capable UE and a second operating zone configuration for a reduced capacity (RedCap) UE based at least in part on the eMBB-capable UE using lower data transfer latencies and/or having more stored power relative to the RedCap UE.

As shown by reference number 620, the network node 110 may transmit, and the UE 120 may receive, a configuration indication that specifies a configuration of multiple operating zones (e.g., an operating zone configuration). As one example, the network node 110 may indicate multiple threshold values as described with regard to FIG. 5. As another example, the network node 110 may indicate selection of one or more operating zone configurations stored in a table. To illustrate, as part of establishing a communication link with the UE 120, the network node 110 may transmit, via RRC signaling, a table of multiple potential operating zone configurations (e.g., multiple combinations of thresholds). Each entry in the table may specify a respective operating zone configuration and/or a respective combination of operating zones. That is, an entry may include a single operating zone configuration (e.g., one or more threshold values that characterize the operating zone) and/or a configuration for a set of operating zones (e.g., a configuration that specifies characteristics of a first operating zone, a second operating zone, and a third operating zone). Accordingly, the configuration indication may indicate selection of one or more entries of the table, such as by indicating one or more indexes that map to the entries.

As described above, the network node 110 may select an operating zone configuration based at least in part on a UE-specific operating profile. Alternatively, or additionally, the network node 110 may select the operating zone configuration based at least in part on a relative prioritization of the associated operating metrics. That is, the network node 110 may configure each operating zone to have a different prioritization of the operating metrics. To illustrate, and with regard to a power consumption operating metric and a data latency operating metric, a first operating zone may be configured to prioritize power consumption higher than data transfer latency, a second operating zone may be configured to prioritize data transfer latency higher than power consumption, and/or a third operating zone may be configured based at least in part on the power consumption and the data transfer latency having a same prioritization level.

The network node 110 may select the operating zone configuration from multiple operating zone configurations based at least in part on the prioritization of the operating metrics and/or a scheduling configuration associated with the prioritization. Some non-limiting examples of scheduling configurations may include any combination of a timing offset configuration (e.g., a K0 offset, a K1 offset, and/or a K2 offset), a BWP configuration, a UE reporting configuration, an SSS configuration, a WUS monitoring configuration, a measurement gap periodicity, a CC configuration, an SUL configuration, a PDCCH skipping configuration (e.g., enabled and/or disabled), and/or a retransmission configuration (e.g., a retransmission timer duration). In some aspects, the network node 110 may select the operating zone configuration based at least in part on a 5QI metric (e.g., satisfying a 5QI operating specification). Alternatively, or additionally, the network node 110 may select (e.g., in a subsequent iteration) the operating zone configuration based at least in part on feedback from the UE 120, such as operating state information as described with regard to reference number 640 and/or updated operating state information as described with regard to reference number 670. In some aspects, each operating zone configuration may be associated with one or more scheduling configurations that enable the network node 110 to satisfy a data transfer latency condition and/or a power consumption condition, such as a scheduling configuration that is based at least in part on satisfying a data transfer latency condition to remain below X msec in combination with a power consumption condition to remain below Y milliwatts (mW), where X and Y represent respective floating point integers.

As shown by reference number 630, the network node 110 may transmit, and the UE 120 may receive, a downlink communication. Alternatively, or additionally, the UE 120 may transmit, and the network node 110 may receive, an uplink communication. In some aspects, the UE 120 may calculate, generate, and/or obtain one or more operating metrics based at least in part on the downlink communication and/or the uplink communication. To illustrate, the UE 120 may calculate, generate, and/or obtain a first operating metric (e.g., a power consumption metric), a second operating metric (e.g., a data transfer latency metric), and/or a third operating metric (e.g., a battery status metric).

As shown by reference number 640, the UE 120 may transmit, and the network node 110 may receive, an operating state indication. To illustrate, the UE 120 may transmit the operating state indication in Layer 1 signaling (e.g., UCI), Layer 2 signaling (e.g., a MAC CE), and/or Layer 3 signaling (e.g., RRC signaling). Transmitting the operating state indication in Layer 1 signaling may enable the UE 120 to communicate operating state information and/or selection of a particular operating zone quickly. As one example, a data transfer latency tolerance may change between each protocol data unit (PDU) and/or between each PDU set. Accordingly, an initial PDU and/or PDU set may be delivered to an application (e.g., at the UE 120 and/or at the network node 110) based at least in part on a first data transfer delay tolerance. If a subsequent PDU remains waiting in a buffer for transmission (e.g., at the UE 120 and/or at the network node 110), the data transfer delay tolerance may change to second data transfer delay tolerance that is shorter than the first data transfer delay tolerance. Accordingly, the UE 120 may quickly indicate the change in the data transfer delay tolerance and/or a change in a prioritization of the data transfer delay quickly using UCI and enable the network node 110 to update the scheduling configuration to satisfy the change in data transfer delay tolerance. Transmitting the operating state indication in Layer 2 signaling and/or Layer 3 signaling may enable the UE 120 to indicate more information relative to using Layer 1 signaling. The additional information may enable the network node 110 to select a first scheduling configuration that better satisfies a prioritization relative to a second scheduling configuration.

The UE 120 may transmit the operating state indication in a PUSCH and/or a physical uplink control channel (PUCCH). For example, the UE 120 may transmit UCI that includes the operating state indication in a PUSCH transmission. Alternatively, or additionally, the UE 120 may multiplex the UCI that includes the operating state indication with a PUCCH transmission, such as a HARQ acknowledgement (ACK) transmission, a scheduling request (SR), and/or channel state information (CSI). The UE 120 may transmit the operating state indication periodically and/or aperiodically. As one example, the UE 120 may transmit the operating state indication based at least in part on detecting a trigger event, such as a trigger event associated with a battery status and/or a battery level satisfying a low threshold. In some aspects, the network node 110 may configure the trigger event and/or a threshold associated with the trigger event. As another example, the UE 120 may transmit the operating state indication based at least in part on a semi-persistent scheduling (SPS).

The operating state indication may specify selection of a particular operating zone (e.g., selection of the first operating zone 510, the second operating zone 512, or the third operating zone 514). For example, the UE 120 may select the particular operating zone from multiple operating zones based at least in part on a first observed value for the first operating metric and/or a second observed value for the second operating metric. That is, the UE 120 may select the particular operating zone using a joint metric (e.g., a first operating metric that is associated with a second operating metric). In some aspects, the first observed value, the second observed value, and/or the joint metric is based at least in part on a maximum value of a set of values. To illustrate, the UE 120 may generate and/or calculate, for each logical channel used by the UE 120, a respective value for a data transfer delay, and each logical channel may be associated with a different value (e.g., a different observed data transfer delay). Accordingly, the set of values may be associated with a set of logical channels, and the UE 120 may use the maximum value from the set of values (e.g., a worst case out of the set) as the first operating metric and/or the second operating metric to ensure that the selected operating zone (e.g., the particular operating zone) satisfies the worst case in addition to the other cases. The UE 120 may indicate the particular operating zone via the operating state indication in a variety of manners, such as by transmitting an identifier associated with the particular operating zone and/or by transmitting a bit pattern (e.g., "00", "01", and/or "10") that maps to the particular operating zone.

Alternatively, or additionally, the operating state indication may specify an alpha factor that is based at least in part on the first operating metric and the second operating metric. "Alpha factor" may denote a factor that falls within a range that is characterized by two boundary values, and each boundary value may be associated with a respective characteristic (e.g., an operating metric). For instance, a first boundary value (e.g., "0") may be associated with the first operating metric (e.g., power consumption) and a second boundary value (e.g., "1") may be associated with the second operating metric (e.g., data transfer latency) or vice versa. In some aspects, the UE 120 may calculate an alpha factor based at least in part on the first operating metric and the second operating metric such that the alpha factor resides within the range of the boundary values and indicates a relative prioritization between the first operating metric and the second operating metric. As an example, a first value closer to the first boundary value may indicate a prioritization of the first operating metric over the second operating metric, and a second value closer to the second boundary value may indicate a prioritization of the second operating metric over the first operating metric. In some aspects, a closeness to the boundary value may indicate a level of prioritization (e.g., high priority level, medium priority level, and/or low priority level). To illustrate, a first alpha factor of 0.8 may indicate that a first level of prioritization of the second operating metric is a medium priority level, and a second alpha factor of 0.95 may indicate that a second level of prioritization of the second operating metric is a high priority level. Accordingly, an alpha factor may provide an indication of how to select a scheduling configuration based at least in part on indicating a relative prioritization between the two associated operating metrics.

In some aspects, the UE 120 may transmit the operating state indication in a single bit, such as a single bit in UCI, and a value of the single bit may be based at least in part on an operating zone observed and/or experienced by the UE 120 (e.g., the particular operating zone selected by the UE 120). For instance, the network node 110 may configure and/or indicate a configuration for a single bit codepoint via any combination of Layer 1 signaling, Layer 2 signaling and/or Layer 3 signaling such that a first value of the single bit (e.g., "0") maps to a first operating zone of the multiple operating zones and a second value of the single bit (e.g., "1") maps to a second operating zone of the multiple operating zones. Accordingly, the UE 120 may select a value for the single bit that indicates the operating zone observed and/or experienced by the UE 120 (e.g., the particular operating zone selected by the UE 120 based at least in part on operating metrics). While the above example describes the UE 120 using a single bit in UCI, other examples may include the UE 120 using more than a single bit in UCI.

The operating state indication may indicate an observed power consumption metric and/or a battery status. The observed power consumption metric and/or the battery status may be an absolute value or a relative metric. As an example of an absolute value, the operating state indication may indicate a floating-point number as the observed power consumption metric and/or the battery status. Alternatively, or additionally, as an example of a relative metric, the observed power consumption metric may be relative to an absolute power consumption metric associated with a configured channel. That is, a relative observed power consumption metric may indicate a difference that is relative to an absolute power consumption metric that is associated with a particular configured channel (e.g., calculated based at least in part on the particular configured channel). In some aspects, the operating state indication may indicate whether the observed power consumption metric and/or the battery status satisfies a value threshold. For example, the battery status may indicate a battery status profile, such as a first profile that indicates a battery level is below a first threshold (e.g., 10% battery level threshold) and/or a second profile that indicates the battery level is above a second threshold (e.g., 50% battery level threshold). The ability to indicate a threshold-based metric (e.g., an indication that the metric satisfies or fails to satisfy a threshold) may enable the UE 120 to return information about power consumption and/or a battery status without providing the network node 110 with explicit values.

In some aspects, the operating state indication may indicate a joint status report that is based at least in part on the first operating metric and the second operating metric. To illustrate, the UE 120 may transmit the operating state indication in a MAC CE and include, in the MAC CE and as part of the operating state indication, a first value for the first operating metric and a second value for the second operating metric. As one non-limiting example, the joint status report may be a joint power consumption and latency status report, the first value may indicate a power consumption metric calculated and/or observed by the UE 120, and the second value may indicate a data transfer latency metric calculated and/or observed by the UE 120. In some aspects, the power consumption metric may be associated with a battery status and/or a battery power level. Accordingly, the joint power consumption and latency status report may include and/or indicate a battery status that is associated with the power consumption metric. Alternatively, or additionally, the joint power consumption and latency status report may indicate multiple data transfer latency metrics, and each data transfer latency metric may be associated with a respective logical channel.

The UE 120 may calculate the power consumption metric as an overall power consumption metric (e.g., entire power consumption calculated by the UE 120). Alternatively, or additionally, the UE 120 may compute the overall power consumption metric based at least in part on one or more configured channels (e.g., an RRC configured channel). To illustrate, the UE 120 may calculate the overall power consumption metric based at least in part on a PUCCH configuration, a PUSCH configuration, a PDCCH configuration, and/or a PDSCH configuration, such as an amount of resources associated with the channel configuration, a transmit power associated with the channel configuration, and/or an RF front end configuration associated with the channel configuration. Alternatively, or additionally, the UE 120 may compute the overall power consumption metric based at least in part on a downlink traffic flow and/or an uplink traffic flow. In some aspects, the UE 120 may calculate the overall power consumption based at least in part on a standardized process, a standardized algorithm, and/or a standardized equation (e.g., specified by a communication standard).

As shown by reference number 650, the network node 110 may transmit, and the UE 120 may receive, scheduling information that indicates a scheduling configuration. As described above, the network node may select the scheduling configuration based at least in part on the operating state indication, such as a timing offset configuration, a BWP configuration, a UE reporting configuration, an SSS configuration, a WUS monitoring configuration, a measurement gap periodicity, a CC configuration, an SUL configuration, a PDCCH skipping configuration (e.g., enabled and/or disabled), and/or a retransmission configuration that is associated with satisfying a prioritization. To illustrate, the UE 120 may indicate, by way of the operating state indication, that the UE 120 is operating within a particular operating zone that prioritizes reducing data transfer delay higher than reducing consumption. Accordingly, the network node 110 may select a scheduling configuration that prioritizes retransmissions, such as a first scheduling configuration that reduces a duration of a retransmission timer to reduce a data transfer delay of the retransmission instead of a second scheduling configuration that increases the duration of the retransmission timer to enable the UE 120 to transition into a deep sleep mode associated with reducing power consumption.

As shown by reference number 660, the network node 110 may transmit, and the UE 120 may receive, a downlink communication based at least in part on the scheduling information. Alternatively, or additionally, the UE 120 may transmit, and the network node 110 may receive, an uplink communication based at least in part on the scheduling information. That is, the network node 110 may transmit a downlink communication based at least in part on a scheduling configuration indicated by the scheduling information and/or the UE 120 may transmit an uplink communication based at least in part on the scheduling configuration indicated by the scheduling information.

As shown by reference number 670, the network node 110 and/or the UE 120 may iteratively perform one or more of the signaling transactions described above. For example, during a first iteration, the UE 120 may transmit a first operating state indication that indicates that the UE 120 is operating in a first operating zone of multiple operating zones configured by the network node 110. In a subsequent iteration, the UE 120 may select a second operating zone from the multiple operating zones based at least in part on calculating updated values for the first operating metric and/or the second operating metric. As described with regard to reference number 640, the UE 120 may transmit a second operating state indication that indicates the second operating zone. Alternatively, or additionally, as described with regard to reference number 650, the network node 110 may transmit updated scheduling information that is based at least in part on the second operating state indication. Accordingly, as described with regard to reference number 650, the network node 110 and the UE 120 may communicate with one another based at least in part on the updated scheduling information. In some aspects, the network node 110 may select an updated operating zone configuration (e.g., an updated set of thresholds) from multiple operating zone configurations based at least in part on the second operating state indication and/or may transmit an indication of the updated operating zone configuration as described with regard to reference number 620.

The ability for a network node to indicate multiple operating zones that are based at least in part on various prioritizations of a first operating metric and a second operating metric, and/or the ability for a UE to indicate a particular operating zone and/or an operating state at the UE, may enable the network node and the UE to jointly determine a scheduling configuration that is based at least in part on satisfying a prioritization between multiple operating metrics. Accordingly, the network node may select, for example, a first scheduling configuration that reduces power consumption to preserve a battery life of the UE and/or a second scheduling configuration that reduces a data transfer latency to satisfy a 5QI operating specification based at least in part on an operating state of the UE.

As indicated above, FIG. 6 is provided as an example. Other examples may differ from what is described with regard to FIG. 6.

FIG. 7 is a diagram illustrating an example process 700 performed, for example, by a UE, in accordance with the present disclosure. Example process 700 is an example where the UE (e.g., UE 120) performs operations associated with scheduling information based on operating zones.

As shown in FIG. 7, in some aspects, process 700 may include receiving a configuration indication that specifies a configuration of multiple operating zones that are based at least in part on a first range of potential values for a first operating metric and a second range of potential values for a second operating metric (block 710). For example, the UE (e.g., using reception component 902 and/or communication manager 906, depicted in FIG. 9) may receive a configuration indication that specifies a configuration of multiple operating zones that are based at least in part on a first range of potential values for a first operating metric and a second range of potential values for a second operating metric, as described above.

As further shown in FIG. 7, in some aspects, process 700 may include transmitting an operating state indication that indicates a particular operating zone of the multiple operating zones (block 720). For example, the UE (e.g., using transmission component 904 and/or communication manager 906, depicted in FIG. 9) may transmit an operating state indication that indicates a particular operating zone of the multiple operating zones, as described above.

As further shown in FIG. 7, in some aspects, process 700 may include receiving scheduling information that is based at least in part on the particular operating zone (block 730). For example, the UE (e.g., using reception component 902 and/or communication manager 906, depicted in FIG. 9) may receive scheduling information that is based at least in part on the particular operating zone, as described above.

Process 700 may include additional aspects, such as any single aspect or any combination of aspects described below and/or in connection with one or more other processes described elsewhere herein.

In a first aspect, the first operating metric and the second operating metric comprise a power consumption metric, and a data transfer latency metric.

In a second aspect, the multiple operating zones comprise at least one of a first operating zone that prioritizes power consumption higher than a data transfer latency, a second operating zone that prioritizes the data transfer latency higher than the power consumption, or a third operating zone that is based at least in part on the power consumption and the data transfer latency having a same prioritization level.

In a third aspect, process 700 includes selecting the particular operating zone based at least in part on a first observed value for the first operating metric and a second observed value for the second operating metric.

In a fourth aspect, the operating state indication is a first operating state indication, the particular operating zone is a first operating zone of the multiple operating zones, and process 700 includes selecting a second operating zone from the multiple operating zones based at least in part on at least one of a third observed value for the first operating metric, or a fourth observed value for the second operating metric, and transmitting a second operating state indication that indicates the second operating zone.

In a fifth aspect, the first observed value is a maximum value of a set of values that are associated with a set of logical channels.

In a sixth aspect, transmitting the operating state indication includes transmitting the operating state indication in at least one of UCI, or a MAC CE.

In a seventh aspect, process 700 includes transmitting a profile indication that specifies a UE-specific operating profile that is based at least in part on the first operating metric and the second operating metric, and the multiple operating zones are based at least in part on the UE-specific operating profile.

In an eighth aspect, process 700 includes calculating two or more metrics, and generating the UE-specific operating profile based at least in part on the two or more metrics.

In a ninth aspect, the operating state indication is a single bit, and a value of the single bit is based at least in part on an observed operating zone In a tenth aspect, the operating state indication indicates an alpha factor that is based at least in part on the first operating metric and the second operating metric.

In an eleventh aspect, transmitting the operating state indication includes transmitting the operating state indication in a physical uplink shared channel.

In a twelfth aspect, transmitting the operating state indication includes transmitting the operating state indication based at least in part on multiplexing the operating state indication with a physical uplink control channel transmission.

In a thirteenth aspect, the operating state indication indicates at least one of an observed power consumption metric, or a battery status.

In a fourteenth aspect, the operating state indication indicates a joint status report that is based at least in part on the first operating metric and the second operating metric.

In a fifteenth aspect, the first operating metric is a power consumption metric, the second operating metric is a data transfer latency matric, and the joint status report is a joint power consumption and latency status report.

In a sixteenth aspect, the joint power consumption and latency status report includes an overall power consumption metric and one or more data transfer latency metrics, and each data transfer latency metric of the one or more data transfer latency metrics is based at least in part on a respective logical channel.

In a seventeenth aspect, process 700 includes computing the overall power consumption metric as a relative power metric that is based at least in part on a configured channel.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a network node, in accordance with the present disclosure. Example process 800 is an example where the network node (e.g., network node 110) performs operations associated with scheduling information based on operating zones.

As shown in FIG. 8, in some aspects, process 800 may include transmitting a configuration indication that specifies a configuration of multiple operating zones that are based at least in part on a first range of potential values for a first operating metric and a second range of potential values for a second operating metric (block 810). For example, the network node (e.g., using transmission component 1004 and/or communication manager 1006, depicted in FIG. 10) may transmit a configuration indication that specifies a configuration of multiple operating zones that are based at least in part on a first range of potential values for a first operating metric and a second range of potential values for a second operating metric, as described above.

As further shown in FIG. 8, in some aspects, process 800 may include receiving an operating state indication that indicates a particular operating zone of the multiple operating zones (block 820). For example, the network node (e.g., using reception component 1002 and/or communication manager 1006, depicted in FIG. 10) may receive an operating state indication that indicates a particular operating zone of the multiple operating zones, as described above.

As further shown in FIG. 8, in some aspects, process 800 may include transmitting scheduling information that is based at least in part on the particular operating zone (block 830). For example, the network node (e.g., using transmission component 1004 and/or communication manager 1006, depicted in FIG. 10) may transmit scheduling information that is based at least in part on the particular operating zone, as described above.

Process 800 may include additional aspects, such as any single aspect or any combination of aspects described below and/or in connection with one or more other processes described elsewhere herein.

In a first aspect, the first operating metric and the second operating metric comprise a power consumption metric and a data transfer latency metric.

In a second aspect, the multiple operating zones comprise at least one of a first operating zone that prioritizes power consumption higher than a data transfer latency, a second operating zone that prioritizes the data transfer latency higher than the power consumption, or a third operating zone that is based at least in part on the power consumption and the data transfer latency having a same prioritization level.

In a third aspect, receiving the operating state indication includes receiving the operating state indication in at least one of UCI, or a MAC CE.

In a fourth aspect, process 800 includes receiving a profile indication that specifies a UE-specific operating profile that is based at least in part on the first operating metric and the second operating metric, and selecting an operating zone configuration for the multiple operating zones based at least in part on the UE-specific operating profile.

In a fifth aspect, selecting the operating zone configuration for the multiple operating zones includes selecting the operating zone configuration for the multiple operating zones based at least in part on a quality-of-service metric.

In a sixth aspect, the operating state indication is a single bit, and a value of the single bit is based at least in part on a relative time scale that is associated with data traffic.

In a seventh aspect, the operating state indication indicates an alpha factor that is based at least in part on the first operating metric and the second operating metric.

In an eighth aspect, receiving the operating state indication includes receiving the operating state indication in a physical uplink shared channel.

In a ninth aspect, receiving the operating state indication includes receiving the operating state indication in a multiplexed physical uplink control channel transmission.

In a tenth aspect, the operating state indication indicates at least one of an observed power consumption metric, or a battery status.

In an eleventh aspect, the operating state indication indicates a joint status report that is based at least in part on the first operating metric and the second operating metric.

In a twelfth aspect, the first operating metric is a power consumption metric, the second operating metric is a data transfer latency matric, and the joint status report is a joint power consumption and latency status report.

In a thirteenth aspect, the joint power consumption and latency status report includes an overall power consumption metric and one or more data transfer latency metrics, and each data transfer latency metric of the one or more data transfer latency metrics is based at least in part on a respective logical channel.

In a fourteenth aspect, the overall power consumption metric is a relative power metric that is based at least in part on a configured channel.

In a fifteenth aspect, process 800 includes selecting an operating zone configuration for the multiple operating zones based at least in part on a prioritization of the first operating metric relative to the second operating metric.

In a sixteenth aspect, selecting the operating zone configuration includes selecting the operating zone configuration from multiple operating zone configurations based at least in part on the prioritization.

In a seventeenth aspect, selecting the operating zone configuration from the multiple operating zone configurations includes selecting the operating zone configuration from the multiple operating zone configurations based at least in part on the operating state indication.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
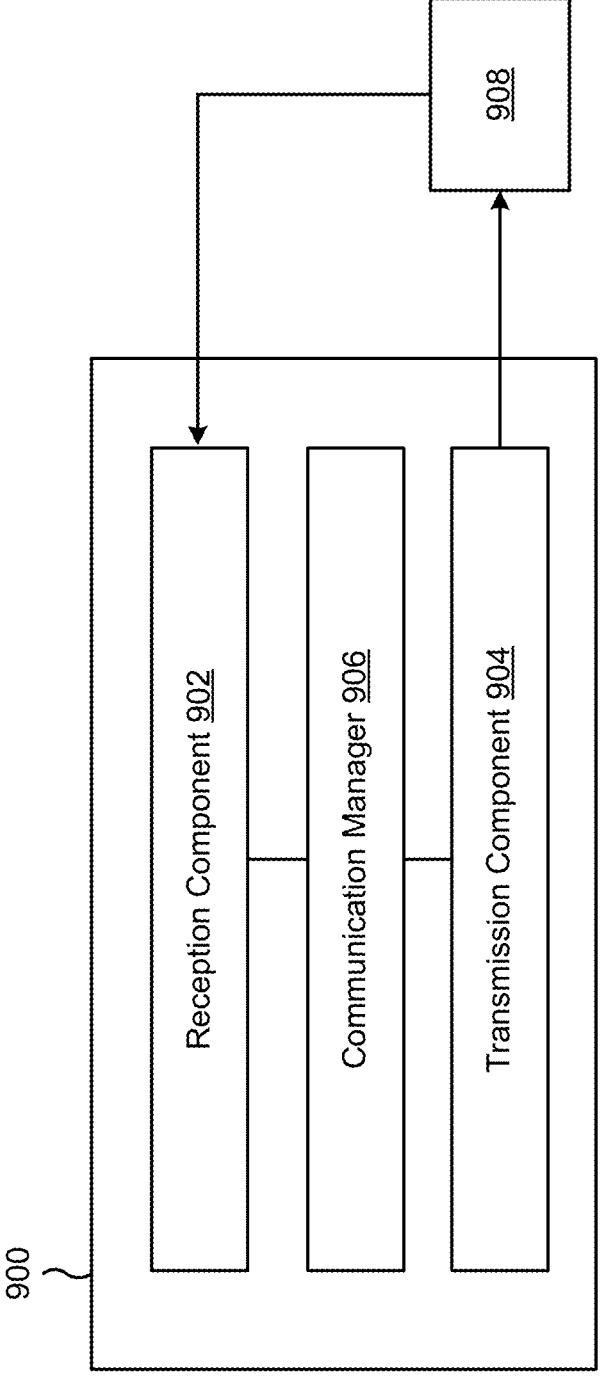
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 140 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 4-8. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The communication manager 906 may receive, by way of the reception component 902, a configuration indication that specifies a configuration of multiple operating zones that are based at least in part on a first range of potential values for a first operating metric and a second range of potential values for a second operating metric. The communication manager 906 may transmit, by way of the transmission component 904, an operating state indication that indicates a particular operating zone of the multiple operating zones. The communication manager 906 may receive, by way of the reception component 902, scheduling information that is based at least in part on the particular operating zone.

The communication manager 906 may select the particular operating zone based at least in part on a first observed value for the first operating metric and a second observed value for the second operating metric. Alternatively, or additionally, the communication manager 906 may transmit, by way of the transmission component 904, a profile indication that specifies a UE-specific operating profile that is based at least in part on the first operating metric and the second operating metric, the multiple operating zones being based at least in part on the UE-specific operating profile. In some aspects, the communication manager 906 may calculate two or more metrics. Alternatively, or additionally, the communication manager 906 may generate the UE-specific operating profile based at least in part on the two or more metrics.

In some aspects, the communication manager 906 may compute an overall power consumption metric as a relative power metric that is based at least in part on a configured channel.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
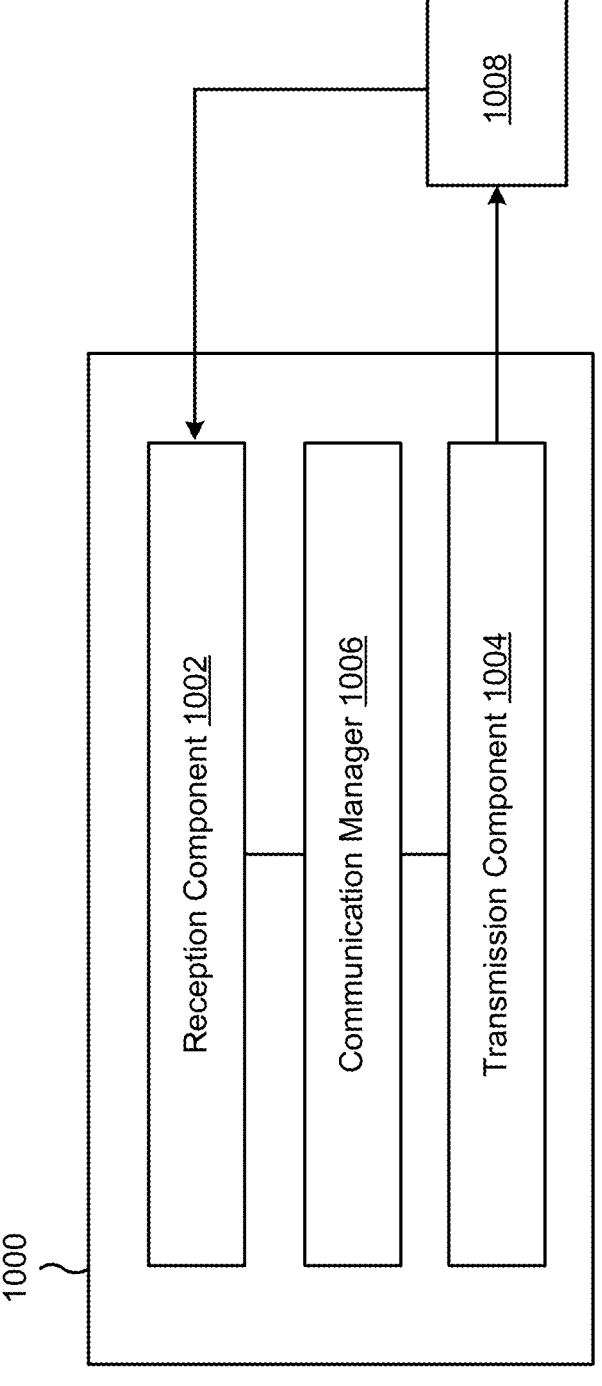
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 150 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 4-8. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2. In some aspects, the reception component 1002 and/or the transmission component 1004 may include or may be included in a network interface. The network interface may be configured to obtain and/or output signals for the apparatus 1000 via one or more communications links, such as a backhaul link, a midhaul link, and/or a fronthaul link.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The communication manager 1006 may transmit, by way of the transmission component 1004, a configuration indication that specifies a configuration of multiple operating zones that are based at least in part on a first range of potential values for a first operating metric and a second range of potential values for a second operating metric. The communication manager 1006 may receive, by way of the reception component 1002, an operating state indication that indicates a particular operating zone of the multiple operating zones. The communication manager 1006 may transmit, by way of the transmission component 1004, scheduling information that is based at least in part on the particular operating zone.

The communication manager 1006 may receive, by way of the reception component 1002, a profile indication that specifies a UE-specific operating profile that is based at least in part on the first operating metric and the second operating metric. In some aspects, the communication manager 1006 may select an operating zone configuration for the multiple operating zones based at least in part on the UE-specific operating profile. Alternatively, or additionally, the communication manager 1006 may select an operating zone configuration for the multiple operating zones based at least in part on a prioritization of the first operating metric relative to the second operating metric.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving a configuration indication that specifies a configuration of multiple operating zones that are based at least in part on a first range of potential values for a first operating metric and a second range of potential values for a second operating metric; transmitting an operating state indication that indicates a particular operating zone of the multiple operating zones; and receiving scheduling information that is based at least in part on the particular operating zone.

Aspect 2: The method of Aspect 1, wherein the first operating metric and the second operating metric comprise: a power consumption metric, and a data transfer latency metric.

Aspect 3: The method of Aspect 2, wherein the multiple operating zones comprise at least one of: a first operating zone that prioritizes power consumption higher than a data transfer latency, a second operating zone that prioritizes the data transfer latency higher than the power consumption, or a third operating zone that is based at least in part on the power consumption and the data transfer latency having a same prioritization level.

Aspect 4: The method of any of Aspects 1-3, further comprising: selecting the particular operating zone based at least in part on a first observed value for the first operating metric and a second observed value for the second operating metric.

Aspect 5: The method of Aspect 4, wherein the operating state indication is a first operating state indication, the particular operating zone is a first operating zone of the multiple operating zones, and the method further comprises: selecting a second operating zone from the multiple operating zones based at least in part on at least one of: a third observed value for the first operating metric, or a fourth observed value for the second operating metric, and transmitting a second operating state indication that indicates the second operating zone.

Aspect 6: The method of Aspect 4 or Aspect 5, wherein the first observed value is a maximum value of a set of values that are associated with a set of logical channels.

Aspect 7: The method of any of Aspects 1-6, wherein transmitting the operating state indication comprises: transmitting the operating state indication in at least one of: uplink control information (UCI), or a medium access control (MAC) control element (CE).

Aspect 8: The method of any of Aspects 1-7, further comprising: transmitting a profile indication that specifies a UE-specific operating profile that is based at least in part on the first operating metric and the second operating metric, wherein the multiple operating zones are based at least in part on the UE-specific operating profile.

Aspect 9: The method of Aspect 8, further comprising: calculating two or more metrics; and generating the UE-specific operating profile based at least in part on the two or more metrics.

Aspect 10: The method of any of Aspects 1-9, wherein the operating state indication is a single bit, and wherein a value of the single bit is based at least in part on an observed operating zone Aspect 11: The method of any of Aspects 1-10, wherein the operating state indication indicates an alpha factor that is based at least in part on the first operating metric and the second operating metric.

Aspect 12: The method of any of Aspects 1-11, wherein transmitting the operating state indication comprises: transmitting the operating state indication in a physical uplink shared channel.

Aspect 13: The method of any of Aspects 1-12, wherein transmitting the operating state indication comprises: transmitting the operating state indication based at least in part on multiplexing the operating state indication with a physical uplink control channel transmission.

Aspect 14: The method of any of Aspects 1-13, wherein the operating state indication indicates at least one of: an observed power consumption metric, or a battery status.

Aspect 15: The method of any of Aspects 1-14, wherein the operating state indication indicates a joint status report that is based at least in part on the first operating metric and the second operating metric.

Aspect 16: The method of Aspect 15, wherein the first operating metric is a power consumption metric, wherein the second operating metric is a data transfer latency matric, and wherein the joint status report is a joint power consumption and latency status report.

Aspect 17: The method of Aspect 16, wherein the joint power consumption and latency status report comprises: an overall power consumption metric, and one or more data transfer latency metrics, wherein each data transfer latency metric of the one or more data transfer latency metrics is based at least in part on a respective logical channel.

Aspect 18: The method of Aspect 17, further comprising: computing the overall power consumption metric as a relative power metric that is based at least in part on a configured channel.

Aspect 19: A method of wireless communication performed by a network node, comprising: transmitting a configuration indication that specifies a configuration of multiple operating zones that are based at least in part on a first range of potential values for a first operating metric and a second range of potential values for a second operating metric; receiving an operating state indication that indicates a particular operating zone of the multiple operating zones; and transmitting scheduling information that is based at least in part on the particular operating zone.

Aspect 20: The method of Aspect 19, wherein the first operating metric and the second operating metric comprise: a power consumption metric, and a data transfer latency metric.

Aspect 21: The method of Aspect 20, wherein the multiple operating zones comprise at least one of: a first operating zone that prioritizes power consumption higher than a data transfer latency, a second operating zone that prioritizes the data transfer latency higher than the power consumption, or a third operating zone that is based at least in part on the power consumption and the data transfer latency having a same prioritization level.

Aspect 22: The method of any of Aspects 19-21, wherein receiving the operating state indication comprises: receiving the operating state indication in at least one of: uplink control information (UCI), or a medium access control (MAC) control element (CE).

Aspect 23: The method of any of Aspects 19-22, further comprising: receiving a profile indication that specifies a UE-specific operating profile that is based at least in part on the first operating metric and the second operating metric; and selecting an operating zone configuration for the multiple operating zones based at least in part on the UE-specific operating profile.

Aspect 24: The method of Aspect 23, wherein selecting the operating zone configuration for the multiple operating zones further comprises: selecting the operating zone configuration for the multiple operating zones based at least in part on a quality-of-service metric.

Aspect 25: The method of any of Aspects 19-24, wherein the operating state indication is a single bit, and wherein a value of the single bit is based at least in part on a relative time scale that is associated with data traffic.

Aspect 26: The method of any of Aspects 19-25, wherein the operating state indication indicates an alpha factor that is based at least in part on the first operating metric and the second operating metric.

Aspect 27: The method of any of Aspects 19-26, wherein receiving the operating state indication comprises: receiving the operating state indication in a physical uplink shared channel.

Aspect 28: The method of any of Aspects 19-27, wherein receiving the operating state indication comprises: receiving the operating state indication in a multiplexed physical uplink control channel transmission.

Aspect 29: The method of any of Aspects 19-28, wherein the operating state indication indicates at least one of: an observed power consumption metric, or a battery status.

Aspect 30: The method of any of Aspects 19-29, wherein the operating state indication indicates a joint status report that is based at least in part on the first operating metric and the second operating metric.

Aspect 31: The method of Aspect 30, wherein the first operating metric is a power consumption metric, wherein the second operating metric is a data transfer latency matric, and wherein the joint status report is a joint power consumption and latency status report.

Aspect 32: The method of Aspect 31, wherein the joint power consumption and latency status report comprises: an overall power consumption metric, and one or more data transfer latency metrics, wherein each data transfer latency metric of the one or more data transfer latency metrics is based at least in part on a respective logical channel.

Aspect 33: The method of Aspect 32, wherein the overall power consumption metric is a relative power metric that is based at least in part on a configured channel.

Aspect 34: The method of any of Aspects 19-33, further comprising: selecting an operating zone configuration for the multiple operating zones based at least in part on a prioritization of the first operating metric relative to the second operating metric.

Aspect 35: The method of Aspect 34, wherein selecting the operating zone configuration comprises: selecting the operating zone configuration from multiple operating zone configurations based at least in part on the prioritization.

Aspect 36: The method of Aspect 35, wherein selecting the operating zone configuration from the multiple operating zone configurations comprises: selecting the operating zone configuration from the multiple operating zone configurations based at least in part on the operating state indication.

Aspect 37: An apparatus for wireless communication at a device, comprising a processor; memory coupled with the processor; and instructions stored in the memory and executable by the processor to cause the apparatus to perform the method of one or more of Aspects 1-19.

Aspect 38: An apparatus for wireless communication at a device, comprising a processor; memory coupled with the processor; and instructions stored in the memory and executable by the processor to cause the apparatus to perform the method of one or more of Aspects 20-36.

Aspect 39: A device for wireless communication, comprising a memory and one or more processors coupled to the memory, the one or more processors configured to perform the method of one or more of Aspects 1-19.

Aspect 40: A device for wireless communication, comprising a memory and one or more processors coupled to the memory, the one or more processors configured to perform the method of one or more of Aspects 20-36.

Aspect 41: An apparatus for wireless communication, comprising at least one means for performing the method of one or more of Aspects 1-19.

Aspect 42: An apparatus for wireless communication, comprising at least one means for performing the method of one or more of Aspects 20-36.

Aspect 43: A non-transitory computer-readable medium storing code for wireless communication, the code comprising instructions executable by a processor to perform the method of one or more of Aspects 1-19.

Aspect 44: A non-transitory computer-readable medium storing code for wireless communication, the code comprising instructions executable by a processor to perform the method of one or more of Aspects 20-36.

Aspect 45: A non-transitory computer-readable medium storing a set of instructions for wireless communication, the set of instructions comprising one or more instructions that, when executed by one or more processors of a device, cause the device to perform the method of one or more of Aspects 1-19.

Aspect 46: A non-transitory computer-readable medium storing a set of instructions for wireless communication, the set of instructions comprising one or more instructions that, when executed by one or more processors of a device, cause the device to perform the method of one or more of Aspects 20-36.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and one or more processors, coupled to the one or more memories, configured, individually or collectively, to:
      receive a configuration indication that specifies a configuration of multiple operating zones that are based at least in part on a first range of potential values for a first operating metric and a second range of potential values for a second operating metric;
      transmit an operating state indication that indicates a particular operating zone of the multiple operating zones, the operating state indication being based on a relative prioritization between the first operating metric and the second operating metric, the relative prioritization being based on a value associated with the first operating metric and a value associated with the second operating metric; and
      receive scheduling information that is based at least in part on the particular operating zone.

2. The apparatus of claim 1, wherein the first operating metric and the second operating metric comprise:
   a power consumption metric, and
   a data transfer latency metric.

3. The apparatus of claim 2, wherein the multiple operating zones comprise at least one of:
   a first operating zone that prioritizes power consumption higher than a data transfer latency,
   a second operating zone that prioritizes the data transfer latency higher than the power consumption, or
   a third operating zone that is based at least in part on the power consumption and the data transfer latency having a same prioritization level.

4. The apparatus of claim 1, wherein the one or more processors are further configured to:
   select the particular operating zone based at least in part on a first observed value for the first operating metric and a second observed value for the second operating metric.

5. The apparatus of claim 1, wherein the one or more processors, to transmit the operating state indication, are configured to:
   transmit the operating state indication in at least one of:
      uplink control information (UCI), or
      a medium access control (MAC) control element (CE).

6. The apparatus of claim 1, wherein the one or more processors are further configured to:
   transmit a profile indication that specifies a UE-specific operating profile that is based at least in part on the first operating metric and the second operating metric,
      wherein the multiple operating zones are based at least in part on the UE-specific operating profile.

7. The apparatus of claim 1, wherein the operating state indication is a single bit, and
   wherein a value of the single bit is based at least in part on an observed operating zone.

8. The apparatus of claim 1, wherein the operating state indication indicates an alpha factor that is based at least in part on the first operating metric and the second operating metric, wherein the relative prioritization is based on a closeness of the alpha factor to the value associated with the first operating metric or the value associated with the second operating metric.

9. The apparatus of claim 1, wherein the one or more processors, to transmit the operating state indication, are configured to:
   transmit the operating state indication in a physical uplink shared channel.

10. The apparatus of claim 1, wherein the one or more processors, to transmit the operating state indication, are configured to:

transmit the operating state indication based at least in part on multiplexing the operating state indication with a physical uplink control channel transmission.

11. The apparatus of claim 1, wherein the operating state indication indicates a joint status report that is based at least in part on the first operating metric and the second operating metric.

12. An apparatus for wireless communication at a network node, comprising:

one or more memories; and one or more processors, coupled to the one or more memories, configured, individually or collectively, to:

transmit a configuration indication that specifies a configuration of multiple operating zones that are based at least in part on a first range of potential values for a first operating metric and a second range of potential values for a second operating metric;

receive an operating state indication that indicates a particular operating zone of the multiple operating zones, the operating state indication being based on a relative prioritization between the first operating metric and the second operating metric, the relative prioritization being based on a value associated with the first operating metric and a value associated with the second operating metric; and transmit scheduling information that is based at least in part on the particular operating zone.

13. The apparatus of claim 12, wherein the first operating metric and the second operating metric comprise:

a power consumption metric, and a data transfer latency metric.

14. The apparatus of claim 13, wherein the multiple operating zones comprise at least one of:

a first operating zone that prioritizes power consumption higher than a data transfer latency, a second operating zone that prioritizes the data transfer latency higher than the power consumption, or a third operating zone that is based at least in part on the power consumption and the data transfer latency having a same prioritization level.

15. The apparatus of claim 12, wherein the one or more processors, to receive the operating state indication, are configured to:

receive the operating state indication in at least one of:

uplink control information (UCI), or a medium access control (MAC) control element (CE).

16. The apparatus of claim 12, wherein the one or more processors are further configured to:

receive a profile indication that specifies a UE-specific operating profile that is based at least in part on the first operating metric and the second operating metric; and select an operating zone configuration for the multiple operating zones based at least in part on the UE-specific operating profile.

17. The apparatus of claim 12, wherein the operating state indication is a single bit, and wherein a value of the single bit is based at least in part on a relative time scale that is associated with data traffic.

18. The apparatus of claim 12, wherein the operating state indication indicates an alpha factor that is based at least in part on the first operating metric and the second operating metric.

19. The apparatus of claim 12, wherein the one or more processors, to receive the operating state indication, are configured to:

receive the operating state indication in a physical uplink shared channel.

20. The apparatus of claim 12, wherein the one or more processors, to receive the operating state indication, are configured to:

receive the operating state indication in a multiplexed physical uplink control channel transmission.

21. The apparatus of claim 12, wherein the operating state indication indicates a joint status report that is based at least in part on the first operating metric and the second operating metric.

22. The apparatus of claim 12, wherein the one or more processors are further configured to:

select an operating zone configuration for the multiple operating zones based at least in part on a prioritization of the first operating metric relative to the second operating metric.

23. The apparatus of claim 22, wherein the one or more processors, to select the operating zone configuration, are configured to:

select the operating zone configuration from multiple operating zone configurations based at least in part on the prioritization.

24. The apparatus of claim 23, wherein the one or more processors, to select the operating zone configuration from the multiple operating zone configurations, are configured to:

select the operating zone configuration from the multiple operating zone configurations based at least in part on the operating state indication.

25. A method of wireless communication performed by a user equipment (UE), comprising:

receiving a configuration indication that specifies a configuration of multiple operating zones that are based at least in part on a first range of potential values for a first operating metric and a second range of potential values for a second operating metric;

transmitting an operating state indication that indicates a particular operating zone of the multiple operating zones, the operating state indication being based on a relative prioritization between the first operating metric and the second operating metric, the relative prioritization being based on a value associated with the first operating metric and a value associated with the second operating metric; and receiving scheduling information that is based at least in part on the particular operating zone.

26. The method of claim 25, wherein transmitting the operating state indication comprises:

transmitting the operating state indication in at least one of:

uplink control information (UCI), or a medium access control (MAC) control element (CE).

27. The method of claim 25, further comprising:

transmitting a profile indication that specifies a UE-specific operating profile that is based at least in part on the first operating metric and the second operating metric, wherein the multiple operating zones are based at least in part on the UE-specific operating profile.

28. The method of claim 25, wherein transmitting the operating state indication comprises:

transmitting the operating state indication based at least in part on multiplexing the operating state indication with a physical uplink control channel transmission.

29. A method of wireless communication performed by a network node, comprising:

transmitting a configuration indication that specifies a configuration of multiple operating zones that are based at least in part on a first range of potential values for a first operating metric and a second range of potential values for a second operating metric;

receiving an operating state indication that indicates a particular operating zone of the multiple operating zones, the operating state indication being based on a relative prioritization between the first operating metric and the second operating metric, the relative prioritization being based on a value associated with the first operating metric and a value associated with the second operating metric; and transmitting scheduling information that is based at least in part on the particular operating zone.

30. The method of claim 29, further comprising:

receiving a profile indication that specifies a UE-specific operating profile that is based at least in part on the first operating metric and the second operating metric; and selecting an operating zone configuration for the multiple operating zones based at least in part on the UE-specific operating profile.

\* \* \* \* \*